United States Patent [19]

Ozawa et al.

[11] Patent Number: 5,395,475
[45] Date of Patent: Mar. 7, 1995

[54] NARROW BELT-SHAPED MEMBER WINDING APPARATUS

[75] Inventors: Chiaki Ozawa; Kazuhide Kinoshita, both of Kodaira, Japan

[73] Assignee: Bridgestone Corporation, Tokyo, Japan

[21] Appl. No.: 963,683

[22] Filed: Oct. 20, 1992

[30] Foreign Application Priority Data

Nov. 13, 1991 [JP] Japan .................. 3-325312

[51] Int. Cl.⁶ .................. B29D 30/08; B29B 30/00
[52] U.S. Cl. .................. 156/397; 156/117; 156/173; 156/175; 156/425
[58] Field of Search .................. 156/117, 397, 173, 177, 156/175, 440, 425, 439

[56] References Cited

U.S. PATENT DOCUMENTS

| | | |
|---|---|---|
| 3,223,572 | 12/1965 | Holloway et al. . |
| 3,720,569 | 3/1973 | Kimble . |
| 3,721,599 | 3/1973 | Addis . |
| 4,461,669 | 7/1984 | Dontscheff .................. 156/574 |
| 4,775,433 | 10/1988 | Ishii .................. 156/397 X |
| 4,822,444 | 4/1989 | Weingart et al. . |
| 4,909,880 | 3/1990 | Kittelson et al. . |

FOREIGN PATENT DOCUMENTS

| | | |
|---|---|---|
| 0453220 | 10/1991 | European Pat. Off. .......... 156/117 |
| 2579130 | 9/1986 | France .................. 156/425 |
| 44133 | 1/1992 | Japan . |
| 4274904 | 9/1992 | Japan . |
| 4331603 | 11/1992 | Japan .................. 152/533 |
| 87565 | 10/1989 | Luxembourg . |

Primary Examiner—Jeff H. Aftergut
Attorney, Agent, or Firm—Sughrue, Mion, Zinn, Macpeak & Seas

[57] ABSTRACT

An apparatus for winding a narrow belt-shaped member in zigzag around a drum. The apparatus includes a support base, and a reciprocative motion device for reciprocatively moving the support base substantially along an axis of the drum between both ends of a predetermined region to maintain the distance between the drum and the support base at a constant value. The apparatus further includes a rocking base supported by the support base rockably about a rocking axis which is a normal to the outer surface of the drum, a rocking device for rocking the rocking base, and an attaching roller supported on the rocking base rotatably about an axis substantially in parallel with the axis of the drum for urging and attaching the supplied belt-shaped member to the drum after being wound partially around the attaching roller. In winding the belt-shaped member around the drum, the rocking base and the attaching roller are rocked by means of the rocking device to cause the rotating axis of the attaching roller to intersect orthogonally a straight line in parallel with the winding direction of the member.

7 Claims, 7 Drawing Sheets

R: Predetermined Region

NARROW BELT-SHAPED MEMBER WINDING APPARATUS

BACKGROUND OF THE INVENTION

The present invention relates to a narrow belt-shaped member winding apparatus for winding a narrow belt-shaped member in a zigzag manner around a drum by supplying to the rotating drum the belt-shaped member being swung in axial directions of the drum.

Hitherto, an apparatus for winding a rubber-coated cord sheet in a zigzag manner around a drum has been known, for example, as disclosed in U.S. Pat. No. 3,721,599. The disclosed apparatus includes a guide tube extending along a normal to the outer surface of a drum and having a forward end adjacent the outer surface of the drum, and-reciprocative motion means for reciprocatively moving the guide tube in the axial directions of the drum. A rubber coated cord sheet is supplied through the guide tube which is swung or reciprocatively moved to wind the sheet in a zigzag manner around the drum.

Moreover, a winding apparatus for spirally winding a cord around a semimanufactured tire has been proposed by the applicant of the present case (refer to JP-A 4-4133, published Jan. 8, 1992) other than the apparatus disclosed in the above U.S. Pat. No. The proposed apparatus comprises a support base, and moving means for moving the support base substantially along an axis of the semimanufactured tire to maintain a distance from it at a constant value. The apparatus further comprises an attaching roller supported on the support base rotatably about an axis substantially in parallel with the axis of the semimanufactured tire for urging and attaching a supplied cord to the semimanufactured tire after being wound partially around the attaching roller. A cord is supplied to the attaching roller moved by the moving means and is urged against the rotating semimanufactured tire by the attaching roller to be spirally wound around the semimanufactured tire.

When a narrow belt-shaped member, for example, a layer made of rubber coated parallel cords is wound in zigzag around a drum by the use of the first mentioned known apparatus, the layer is likely to be deformed and incorrectly wound around the drum. This is because the layer is subjected to a large external force in its width direction from the guide tube owing to the great difference in direction between the supply direction and winding direction of the layer.

On the other hand, when a narrow belt-shaped member, for example, a layer is wound in a zigzag manner around a drum by the use of the second mentioned proposed apparatus, the winding direction of the layer is greatly inclined relative to the circumferential direction of the drum in comparison with that in spirally winding. As a result, the winding direction of the layer is greatly different from the supply direction of the layer (the circumferential direction of the drum in this case), causing a large external force acting upon the layer from the attaching roller in its axial direction. Consequently, the layer is deformed to be incorrectly wound around the drum as in the first mentioned known apparatus and the layer is dislodged from the attaching roller, making it impossible to wind the layer around the drum as the case may be.

SUMMARY OF THE INVENTION

It is an object of the invention to provide a narrow belt-shaped member winding apparatus which, although it is simple in construction, is able to wind a narrow belt-shaped member in zigzag around a drum in a good condition.

In order to accomplish this object, in a narrow belt-shaped member winding apparatus for winding a narrow belt-shaped member in a zigzag manner around a drum by supplying to said rotating drum the belt-shaped member being swung in axial directions of said drum within a predetermined region, the apparatus according to the invention comprises a support base, reciprocative motion means for reciprocatively moving said support base substantially along an axis of said drum between both ends of the predetermined region to maintain a distance between said drum and said support base at a constant value, a rocking base supported by said support base rockably about a rocking axis which is a normal to the outer surface of said drum, rocking means for rocking said rocking base, and an attaching roller supported on said rocking base rotatably about an axis substantially in parallel with said axis of the drum for urging and attaching the supplied belt-shaped member to said drum after being wound partially around said attaching roller, thereby causing the rotating axis of the attaching roller to intersect perpendicularly a straight line in parallel with winding directions of the belt-shaped member by rocking said rocking base and said attaching roller by means of said rocking means.

It is now assumed that the drum is being rotated and the support base is being moved by the reciprocative motion means from one side to the other side of the drum in its axial direction, maintaining the distance of the support base from the drum at a constant value. In this case, a narrow belt-shaped member supplied to the attaching roller is urged against the drum by means of the attaching roller after being wound partially around the attaching roller. As a result, the belt-shaped member is attached to the circumference of the drum at an inclined angle such that the layer approaches the other axial end of the drum as it advances forward in the rotating direction of the drum.

In this case, the rocking base has been rocked about its rocking axis by means of the rocking means so that the straight line in parallel with the winding direction of the belt-shaped member perpendicularly intersects the rotating axis of the attaching roller. Consequently, the supply direction and the winding direction of the belt-shaped member are coincident with each other, so that the narrow belt-shaped member is not subjected to any external force in its width direction by the attaching roller in winding, with the result that the narrow belt-shaped member is perfectly wound around the drum. When the support base is moved from the other side to the one side of the drum in its axial direction, the inclined direction of the narrow belt-shaped member becomes opposite to that described above. In this case, the rocking base is rocked by means of the rocking means in the same manner as described above so that the straight line in parallel with the winding direction of the belt-shaped member perpendicularly intersects the rotating axis of the attaching roller.

The invention will be more fully understood by referring to the following detailed specification and claims taken in connection with the appended drawings.

DESCRIPTION OF THE PREFERRED EMBODIMENTS

Figure 1:
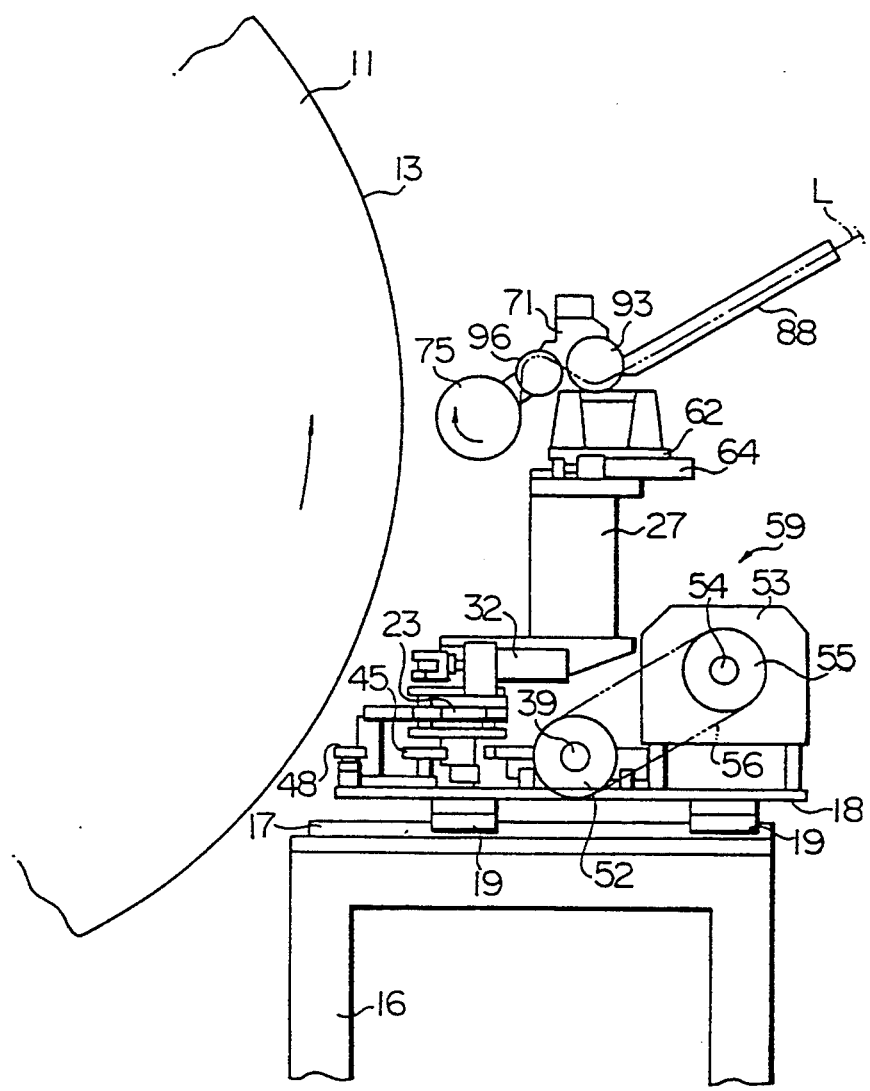
FIG. 1 is a side view generally illustrating one embodiment of the apparatus according to the invention.
Figure 2:
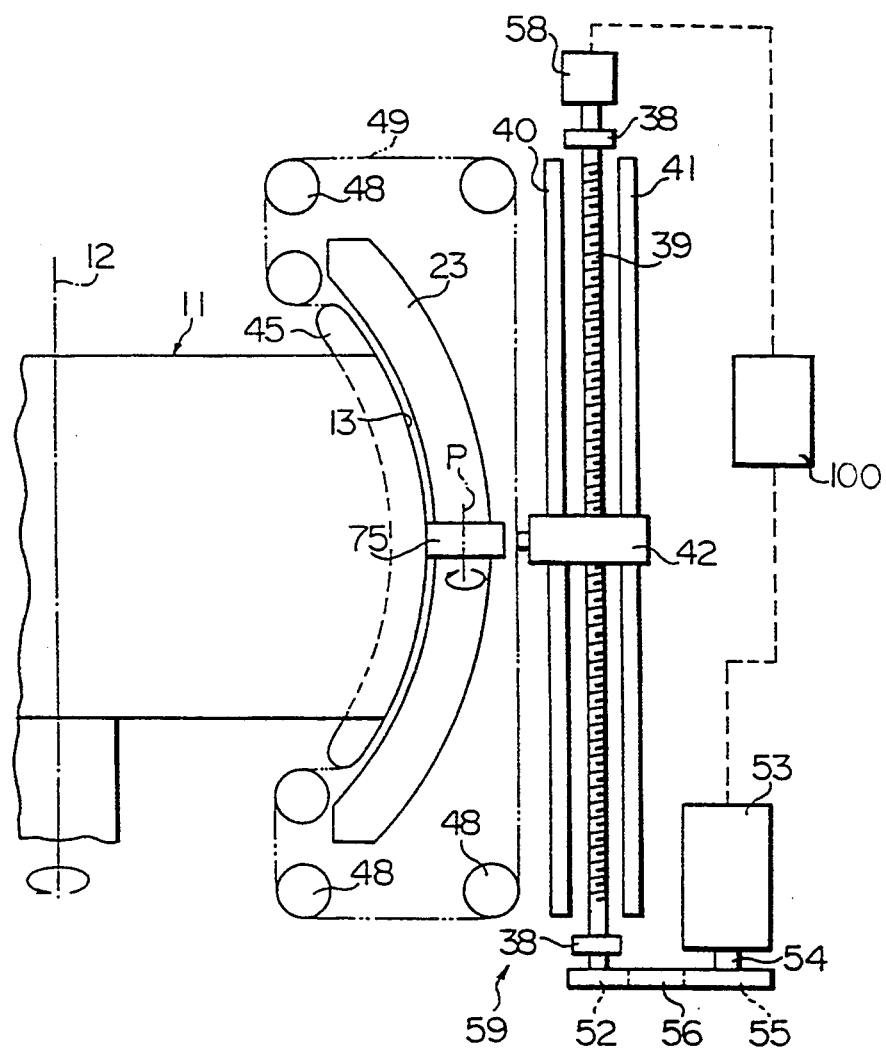
FIG. 2 is a plan view of the apparatus shown in FIG. 1.
Figure 3:
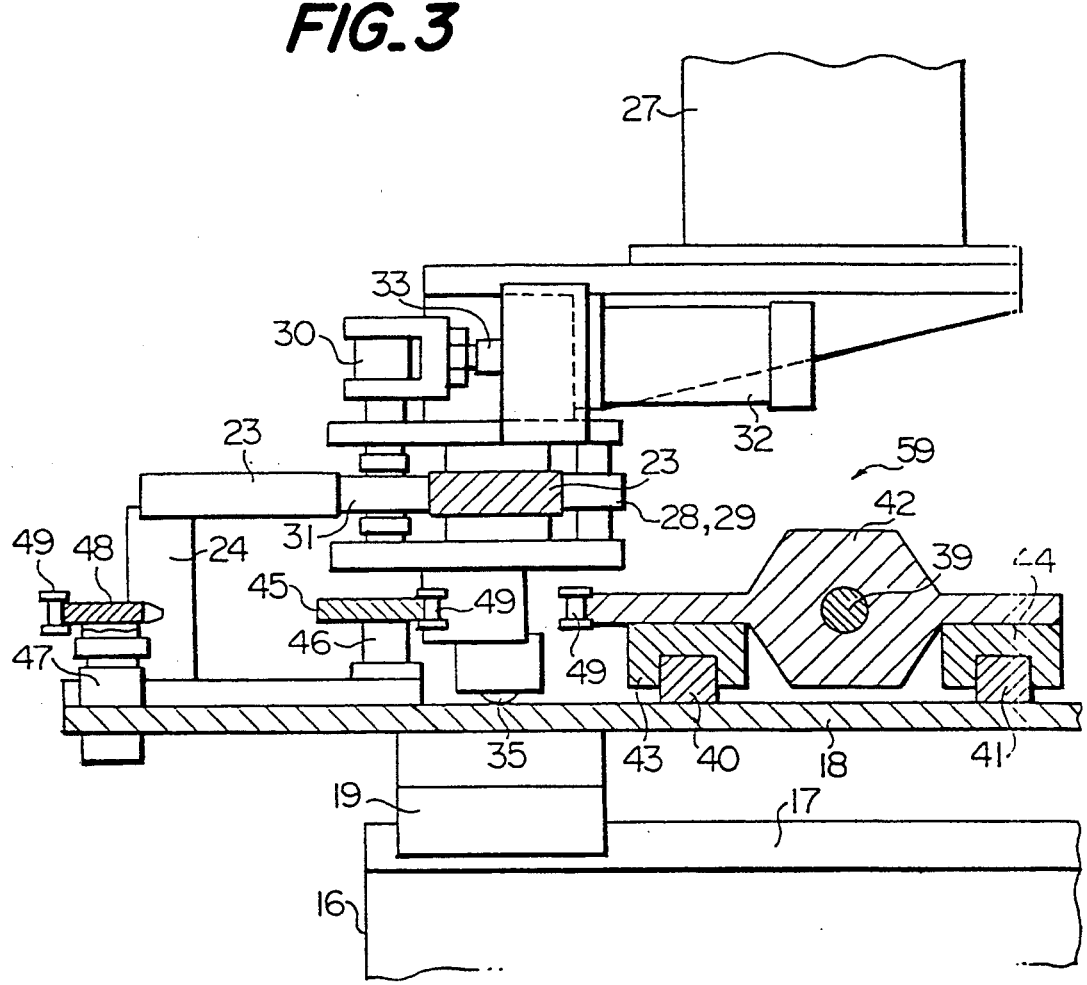
FIG. 3 is a partially sectional side view of the reciprocative motion means used in the apparatus shown in FIG. 1.
Figure 4:
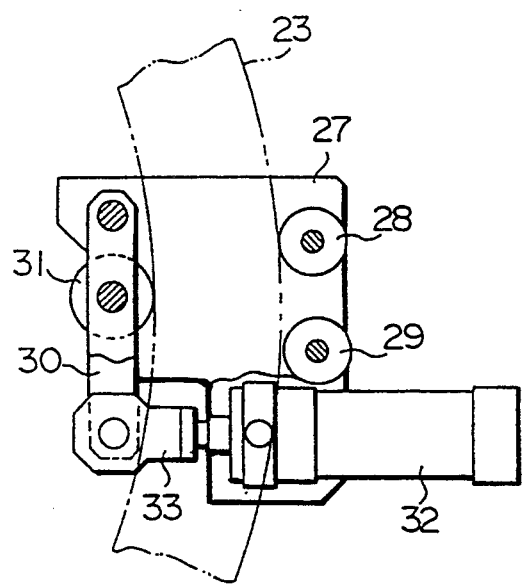
FIG. 4 is a partial plan view illustrating the rollers of guide means used in the apparatus shown in FIG. 1.
Figure 5:
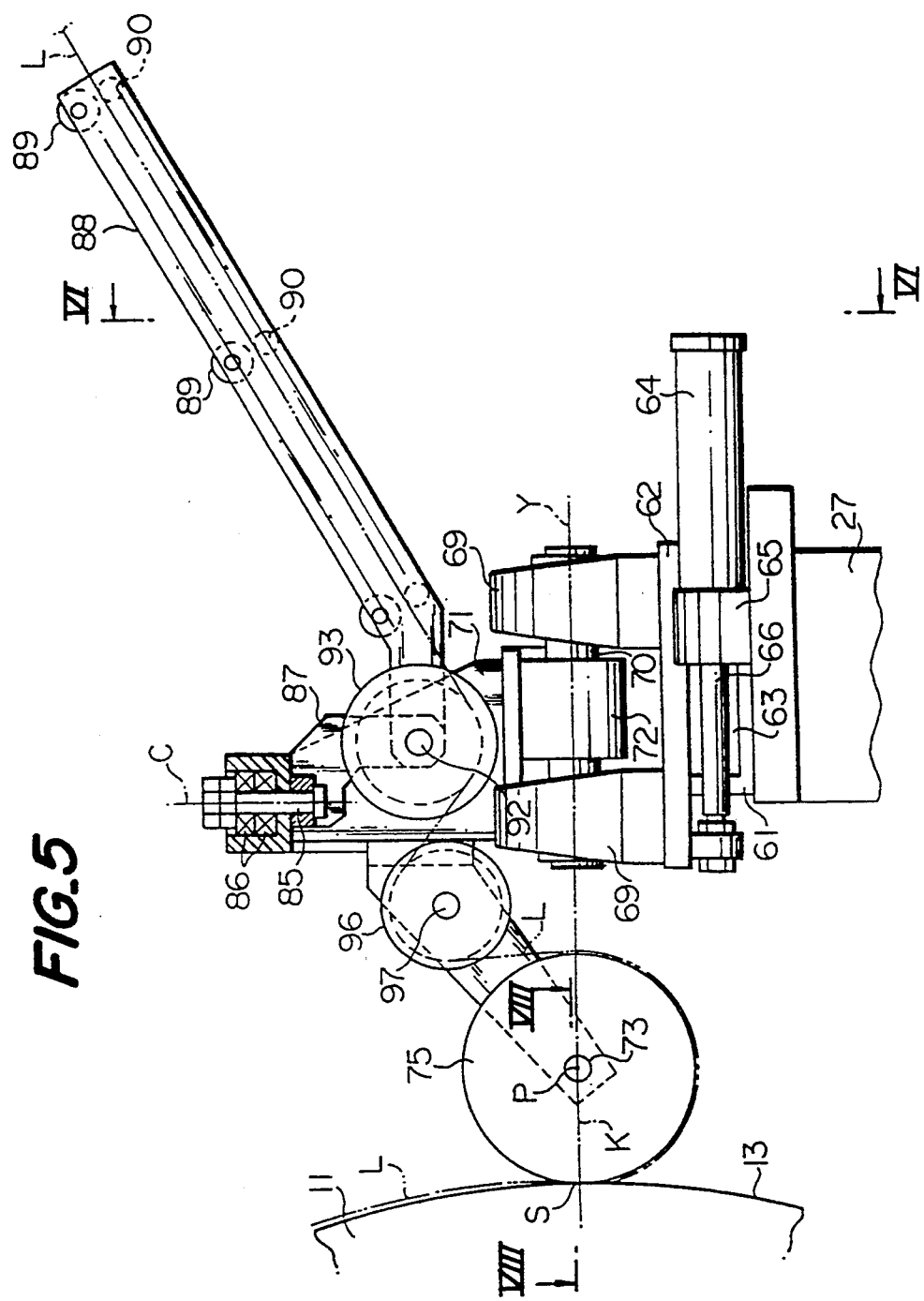
FIG. 5 is a partially sectional side view illustrating the rocking base used in the apparatus shown in FIG. 1.

Referring to FIGS. 1 and 2, a drum 11 is provided whose radii from the axis 12 to the outer surface 13 change depending upon axial positions of the surface. In the shown embodiment, the radii progressively decrease from the axial center to both the axial ends to form the arcuate outer surface 13 in a sectional plane including a meridian of the drum. The drum 11 is rotatively driven about the horizontal axis 12 by means of a motor (not shown). An encoder (not shown) is provided which is adapted to detect angular rotation of the drum 11.

Referring to FIGS. 1, 2, 3 and 4, rearward of the drum 11 is a base frame 16 on which are provided a pair of rails 17 extending perpendicularly to the axis of the drum 11. A horizontal base plate 18 is provided on its underside with a plurality of slide bearings 19 which are slidably engaged on the rails 17. Above the base plate 18, is arranged a horizontal arcuate guide plate 23 extending along the outer surface 13 at a meridian section of the drum 11. Both the ends of the arcuate guide plate 23 are mounted on blocks 24 fixed to the base plate 18. In the case that the outer surface 13 of the drum 11 forms a curvature, the inner periphery of the guide plate 23 has a center of the curvature positioned at the center of the curvature of the outer surface 13 of the drum 11.

A traverse frame 27 (FIGS. 3 and 4) rotatably carries at its bottom a pair of rollers 28 and 29 arranged spaced from each other by a predetermined distance in the longitudinal direction of the guide plate 23 and rotatable about their vertical axes such that these rollers 28 and 29 are in rotating contact with the outer periphery of the guide plate 23. A horizontal arm 30 is arranged on the opposite side of the rollers 28 and 29 with respect to the guide plate 23 and has one end pivotally connected to the traverse frame 27. A roller 31 is supported by the horizontal arm 30 substantially at its longitudinal center to be rotatable about a vertical axis and in rolling contact with the inner periphery of the guide plate 23.

A cylinder 32 is rockably supported on the bottom of the traverse frame 27 so as to extend perpendicular to the rotating axis of the drum 11. The cylinder 32 includes a piston rod 33 whose outer end is pivotally connected to the other end of the horizontal arm 30.

When the cylinder 32 is actuated to retract its piston rod 33, the roller 31 is urged against the inner periphery of the guide plate 23 to embrace the guide plate 23 on its inner and outer sides in cooperation with the rollers 28 and 29. When the rollers 28, 29 and 31 contact the outer and inner peripheries of the guide plate 23, the vertical axes of these rollers form an imaginary isosceles triangle whose median orthogonally intersect a straight line in parallel with the axis of the drum 11. Balls 35 are supported on the bottom of the traverse frame 27 to roll on the upper surface-of the base plate 18.

Referring again to FIGS. 1, 2 and 3, on the base plate 18 distanced from the drum further than the guide plate 23 are arranged a pair of bearings 38 spaced in the axial direction of the drum 11 from each other for rotatably supporting both ends of a screw shaft 39 extending in parallel with the axis 12 of the drum 11. Slide rails 40 and 41 are arranged on both sides of the screw shaft 39 on the base plate 18 and extend in parallel with the screw shaft 39. The screw shaft 39 is threadedly engaged in a movable block 42 to which are fixed slide bearings 43 and 44 slidably engaging the slide rails 40 and 41, respectively. A horizontal arcuate chain guide 45 is mounted on blocks 46 fixed on the base plate 18 and arranged below the guide plate 23 immediately in front of the guide plate 23.

The outer periphery of the chain guide 45 extends along and substantially directly below the inner periphery of the guide plate 23 and has a center of the curvature positioned at the center of the curvature of the outer surface 13 of the drum 11 in the same manner as in the inner periphery of the guide plate 23. Receiving bases 47 are arranged on the base plate 18 for rotatably supporting sprockets 48 which are rotated about their vertical axes, respectively. An endless chain 49 extends around sprockets 48, running in sliding contact with the outer periphery of the chain guide 45. When the endless chain 49 is in contact with the outer periphery of the chain guide 45, if a vertical straight line is extended downwardly from the contact point S between the outer surface 13 of the drum 11 and the outer circumferential surface of an attaching roller later described, the vertical straight line passes through the chain 49.

The movable block 42 is connected to the chain 49 at a point thereon, and the bottom of the traverse frame 27 is connected to the chain 49 at two points thereon spaced equal distances in opposite directions from the point connected to the movable block 42. A timing pulley 52 is fixed to one end of the screw shaft 39. A timing belt 56 extends around the timing pulley 52 and a timing pulley 55 fixed to the rotating shaft 54 of a motor 53 fixed to the base plate 18. An encoder 58 is secured to the other end of the screw shaft 39 to detect angular rotation of the screw shaft 39, thereby detecting axial positions of the traverse frame 27 and hence the attaching roller later described.

Referring to FIGS. 1, 2, 3, 4, 5 and 6, a pair of guide rails 61 are arranged on the upper surface of the traverse frame 27 to extend in the direction perpendicular to the axis of the drum 11. Slide bearings 63 mounted on the underside of a support base 62 slidably engage the guide rails 61. When the motor 53 is energized, the chain 49 moves in sliding contact with the outer periphery of the chain guide 45 so that the traverse frame 27 moves along the outer surface 13 of the drum 11 with the aid of the guide plate 23 guiding the traverse frame 27. The reciprocative motion means is thus constructed from the guide plate 23, the traverse frame 27, the rollers 28, 29 and 31, the arm 30, the cylinder 32, the balls 35, the screw shaft 39, the slide rails 41, the movable block 42, the chain guide 45, the sprockets 48, the endless chain 49 and the motor 53 for reciprocatively moving the support base 62 substantially along the axis 12 of the drum 11, more exactly along the outer surface 13 of the drum 11 in this case, to maintain the distance between the drum 11 and the support base 62 at a constant value.

Referring to FIGS. 1, 5, 6 and 7, a cylinder 64 is mounted on the upper surface of the traverse frame 27 by means of a bracket 65 to extend in the direction perpendicular to the axis of the drum 11. The cylinder 64 includes a piston rod 66 whose rod end is connected to the support base 62. As a result, when the cylinder 64 is actuated, the support base 62 is moved toward and away from the drum 11. A pair of bearings 69 are spaced from each other in the direction perpendicular to the axis of the drum 11 and mounted on the upper surface of the support base 62 for rotatably supporting both the ends of a horizontal shaft 70 also extending in the direction perpendicular to the axis of the drum 11. A rocking base 71 is provided with a block 72 into which the horizontal shaft 70 is inserted. On the forward end of the rocking base 71 is mounted a shaft 73 extending at the same level as and in parallel with the axis 12 of the drum 11.

Figure 8:
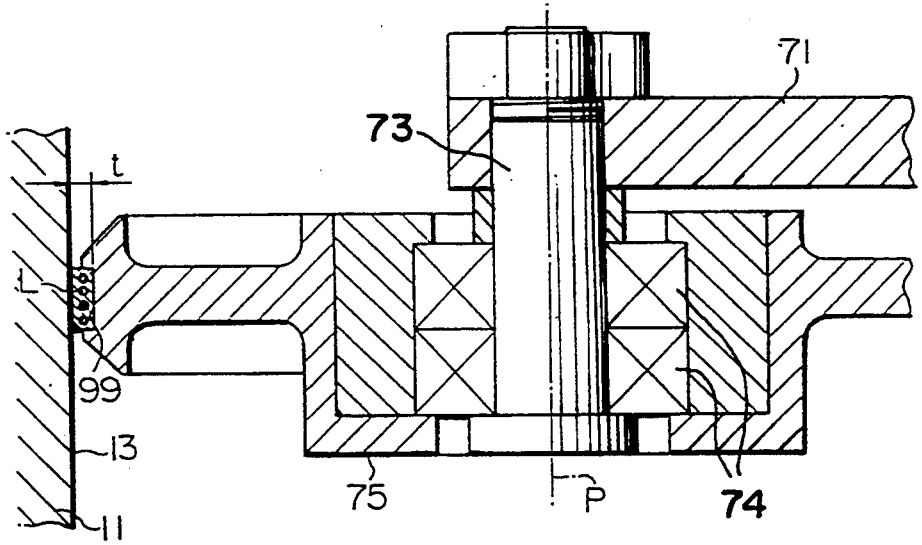
FIG. 8 is a sectional view of the attaching roller taken along the line VIII—VIII in FIG. 5.

A pair of bearings 74 are inserted between the shaft 73 and an attaching roller 75 surrounding it (FIG. 8). Consequently, the attaching roller 75 is rotatable about an axis P substantially in parallel with the axis 12 of the drum 11. In this case, the rocking axis Y of the rocking base 71 or the center axis of the shaft 70 is coincident with the normal K to the outer surface 13 of the drum 11 at the contact point S between the outer surface 13 of the drum 11 and the outer circumferential surface of the attaching roller 75 at the center of its width. A pair of vertically extending cylinders 77 and 78 are integrally connected to each other by means of a bracket 79 and arranged on the side of the rocking base 71. The cylinder 77 has a piston rod 80 whose rod end is connected to the lower end of the support base 62, while the other cylinder 78 has a piston rod 81 whose rod end is connected to the rocking base 71.

Figure 6:
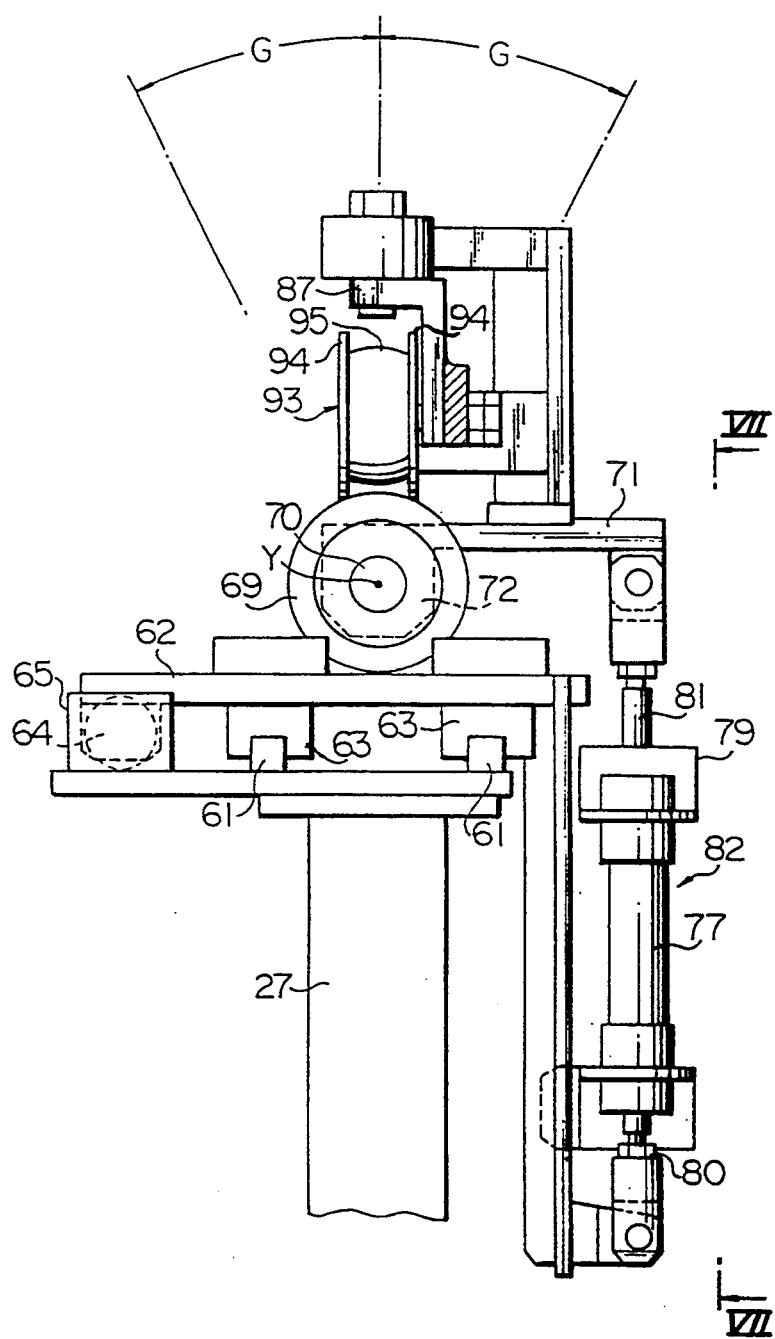
FIG. 6 is a view of the rocking means viewed in the direction of arrows VI in FIG. 5.

When the piston rod 80 of the cylinder 77 is fully retracted therein and the piston rod 81 of the other cylinder 78 is fully extended therefrom, the rotating axis P of the rocking base 71 and the attaching roller 75 is horizontal. However, when the cylinder 77 is actuated to extend the piston rod 80 from the fully retracted position to the fully extended position, the rocking base 71 and the attaching roller 75 are rocked about the rocking axis Y through an angle G in the counterclockwise direction as shown in FIG. 6. On the other hand, when the cylinder 78 is actuated to retract the piston rod 81 from the fully extended position to the fully retracted position, the rocking base 71 and the attaching roller 75 are rocked about the rocking axis Y through an angle G in the clockwise direction as shown in FIG. 6. The cylinders 77 and 78 and the bracket 79 form as a whole the rocking means 82 for rocking the rocking base 71. The rocking axis Y of the rocking base 71 is coincident with the normal K passing through the contact point S. Therefore, the contact point S at which the attaching roller 75 contacts the drum 11 will remain unchanged, no matter what directions the rocking base 71 and attaching roller 75 may rock.

A shaft 85 is vertically extended and rotatably supported on the upper end of the rocking base 71 by means of a pair of bearings 86. The upper end of a bracket 87 is secured to the lower end of the shaft 85, while the lower end of the bracket 87 is connected to the forward end of a guide unit 88 extending in the rearward direction by means of a horizontal shaft 92. Pairs of guide rollers 89 and 90 spaced vertically from each other are rotatably supported by the guide unit 88. A layer L, as a narrow belt-shaped member, for example, a rubber coated cord sheet whose cords are arranged parallel to one another is continuously payed out of a winding drum or layer forming device (not shown) which is arranged rearward of the guide unit 88 and fed into the guide unit 88. The fed layer is forward supplied through the guide rollers 89 and 90.

The guide unit 88 is rockable about the shaft 85 in the horizontal direction. Therefore, if the payed-out position of the layer L changes or the support base 62 moves along the outer surface 13 of the drum 11, the guide unit 88 can be directed to the payed-out position of the layer L to ensure that the layer L is reliably guided and supplied.

A supply roller 93 is rotatably supported by the shaft 92 at the lower end of the bracket 87. The supply roller 93 has at the axial ends flanges 94 and is bulged between the flanges to have diameters larger as they are nearer to the axial center of the roller 93 to form a barrel-shaped roller. After passing through the guide unit 88, the layer L is forwardly supplied by winding partially around the outer peripheral surface 95 of the supply roller 93. The layer L is subjected to a centering action to be forwardly fed by the supply roller 93 in a stable condition, given as its bulged circumferential surface 95.

A supply roller 96 is rotatably supported by a shaft 97 on the rocking base 71 between the supply roller 93 and the attaching roller 75. The axis of the supply roller 96 and hence the shaft 97 is in parallel with the center axis of the shaft 73. The layer L which has passed the supply roller 93 is turned to a different direction by partially winding it around the outer circumferential surface of the supply roller 96. Thereafter, the layer L is fed to the attaching roller 75. The center axis C of the vertical shaft 85 extends through the center of the forward end of the outer peripheral surface 95 of the supply roller 93. Therefore, if the guide unit 88 and the supply roller 93 are rocked, the position of the layer L where it leaves the supply roller 93 remains constant. As a result, the layer L does not deflect from the supply roller 93 in spite of the rocking movement of the guide unit 88 and the supply roller 93.

Moreover, the rocking movement of the guide unit 88 is accommodated by the twisting of the layer L between the supply rollers 93 and 96. As shown in FIG. 8, the attaching roller 75 is formed in its outer peripheral surface with a guide groove 99 having a depth less than the thickness t of the layer L and extending in the circumferential direction of the attaching roller 75. The layer L fed from the supply roller 96 is guided into the guide groove 99 of the attaching roller 75 and then wound around the circumference of the attaching roller 75 over a predetermined angle. Thereafter, the layer L is fed to the contact point S shown in FIG. 5 by the rotation of the attaching roller 75. The layer L is urged at the contact point S to the outer surface of the drum 11 and attached to it by means of the attaching roller 75.

Figure 7:
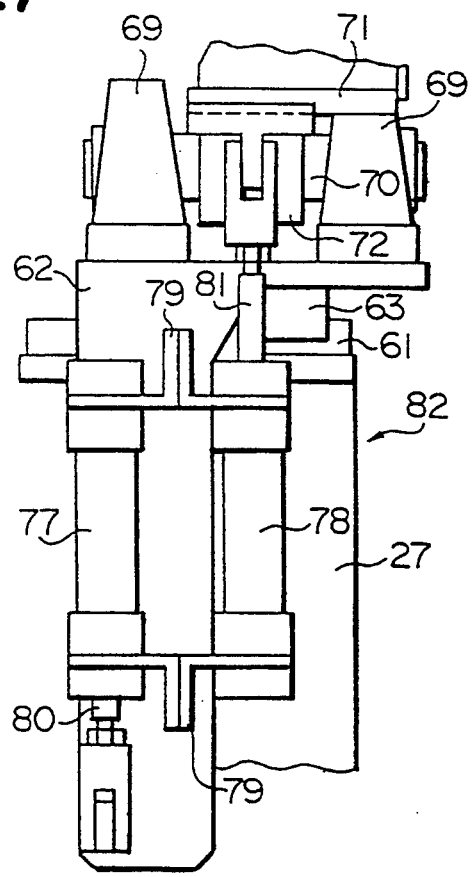
FIG. 7 is a view of the rocking means viewed in the direction of arrows VI in FIG. 6.
Figure 9:
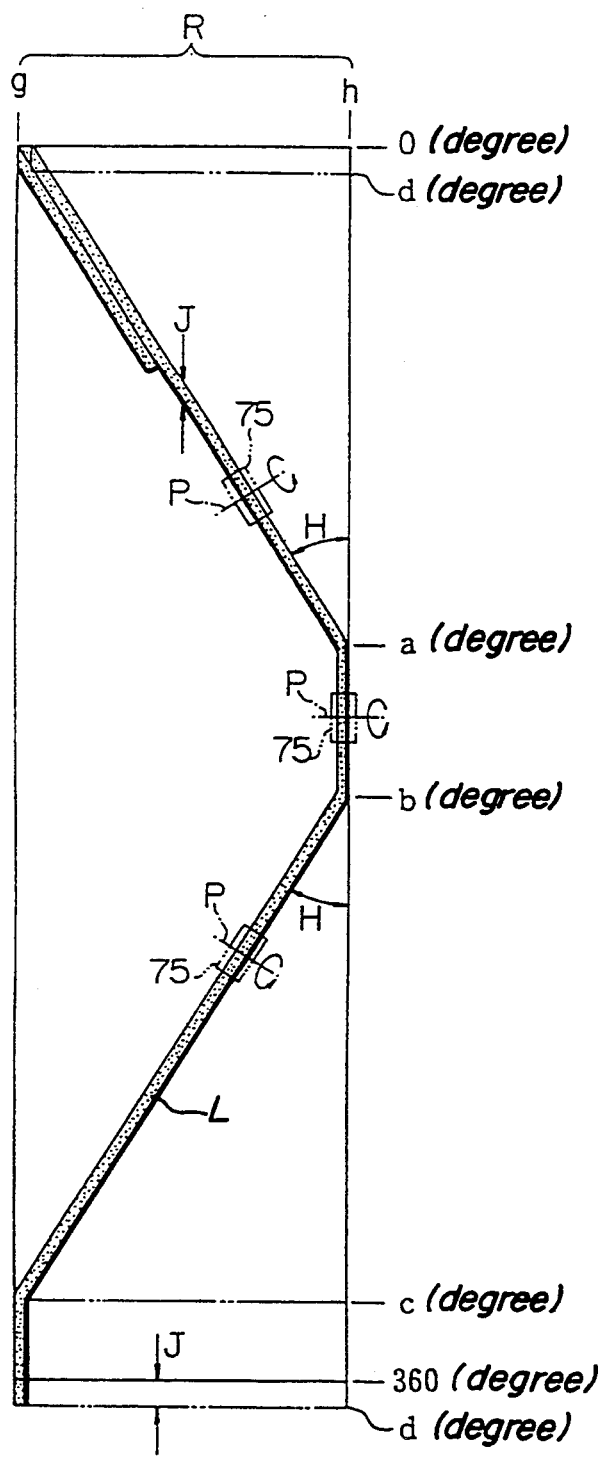
FIG. 9 is a development view illustrating the attachment of a narrow belt-shaped member to the drum according to the invention.

Referring to FIGS. 2, 7 and 9, reference numeral 100 denotes a sequencer which receives detection signals from the encoder at the drum 11 and the encoder 58 and outputs control signals to the motor for the drum 11, the motor 53 and the cylinders 77 and 78. The sequencer 100 has memorized various data such as annular positions where the drum 11 should stop and start, extreme positions of reciprocative movements of the support base 62 and the attaching roller 75, rotating speeds and total revolutions of the drum 11. In the case where a layer L is progressively attached to the outer surface 13 of the drum 11 in a zigzag pattern in a range as shown in FIG. 9, the four rotating angles (a), (b), (c) and (d) degrees for stop and start of the drum 11 have been memorized in the sequencer 100. The rotating drum 11 is once stopped or started at respective moments when integrated values of detection signals from the when encoders correspond to the four rotating angles as the drum 11 is rotating.

In this case, the degree (d) is 360° plus a predetermined angle J, for example, a value calculated from the width of the layer L and belt angles. In order to achieve the extreme positions of the reciprocative movement of the attaching roller 75, points g and h spaced a constant distance from the axial center of the drum 11 are memorized in the sequencer 100 and when the attaching roller 75 has just arrived at each of the points g and h, the motor 53 is once deenergized to stop the attaching roller 75. Then the layer L is circumferentially attached to the drum 11 over the predetermined angle, that is to say, between angles (a) and (b) or between angles (c) and (d). For this purpose, when the drum 11 has arrived at the positions of the angles (b) and (d), the motor is again energized in the reverse direction to move (return) the attaching roller 75 in the opposite direction.

Concerning the rotating speeds of the drum 11, memorization is effected such that it is rotated at constant high speeds between the angles (d) and (a), between angles (b) and (c) and between the initial zero angle and the angle (a), while at constant low speeds between the angles (a) and (b) and between the angles (c) and (d). As a result, the drum 11 is rotated at high speeds when the layer L is attached at inclined angles, while the drum 11 is rotated at low speeds when the layer L is attached in the circumferential direction. Moreover, concerning the total revolutions, the revolution number of the drum 11 for completely attaching the layer L to the aforementioned region is memorized as a value of one section. In the case that the layer is further attached onto the attached layer L, the laminated number is multiplied by the value and the obtained value is memorized.

The operation of the apparatus of the embodiment according to the invention described above will be explained hereinafter.

In the case that a layer L is wound around the outer surface 13 of the drum 11 in a zigzag pattern in the predetermined region R between the points g and h (FIG. 9), after the layer L payed out of a winding drum or the like has passed through the guide unit 88, the layer L is introduced through the supply rollers 93 and 96 into the guide groove 99 of the attaching roller 75. The base plate 18 is then advanced along the guide rails 17 and fixed at the advanced position. The cylinder 64 is then actuated to extend its piston rod 66 so that the support base 62, the rocking base 71 and the attaching roller 75 are in unison advanced toward the drum 11, with the result that the layer L on the attaching roller 75 is urged against the drum 11.

The cylinder 77 is then actuated to extend its piston rod 80 to the full extent so that the rocking base 71 and the attaching roller 75 are rocked about the rocking axis Y through the angle G in the counterclockwise direction viewed in FIG. 6. In this case, the angle G is substantially equal to an inclined angle H of the layer L to be wound around the drum 11 relative to the circumferential direction of the drum 11. As a result, a straight line in parallel with the winding direction of the layer L intersects the rotating axis P of the attaching roller 75 at right angles. Thereafter, control signals are sent from the sequencer 100 to the motor of the drum 11 and the motor 53 to actuate them, so that the drum 11 is rotated at a predetermined high speed and the screw shaft 39 is rotated. The rotation of the screw shaft 39 is converted by means of the movable block 42 into a straight movement which drives the chain 49.

As a result, the traverse frame 27, the support base 62 and the rocking base 71 are moved in unison along the outer surface 13 of the drum 11 from its one axial end to the other axial end, keeping constant the distances from the drum 11. Consequently, the attaching roller 75 is moved from one end to the other end of the region R, that is to say, from the point g to the point h. As a result, the layer L wound partially around the attaching roller 75 is supplied between the attaching roller 75 and the drum 11 to be urged against the outer surface 13 of the drum 11 by means of the attaching roller 75.

In this manner the layer L is attached to the outer periphery of the drum 11 at an inclined angle such that the layer L approaches the other axial end of the drum 11 as it advances forward in the rotating direction of the drum 11. As the straight line in parallel with the winding direction of the layer L intersects the rotating axis P of the attaching roller 75 at right angles, the supply direction and the winding direction of the layer L are coincident with each other. Consequently, the layer L upon being wound is not subjected to any external force in its width direction from the attaching roller 75 so that the layer L can be wound around the drum 11 in a good condition.

When it has just been detected with the aid of the signal from the encoder for the drum and the signal from the encoder 58 that the drum 11 has been rotated through the angle (a) from the initial zero angle and the attaching roller 75 has arrived at the point h, the drum 11 is stopped and the motor 53 is deenergized. Thereafter, a signal is output from the sequencer 100 to the cylinder 77 so as to actuate it to retract its piston rod 80 to the full extent. As a result, the rocking base 71 and the attaching roller 75 are rocked about the rocking axis Y until the axis P of the attaching roller 75 becomes horizontal. A control signal is then output from the sequencer 100 to the drum 11 to rotate it at the low speed, while the motor 53 is inoperative. Consequently, the layer L is attached to the drum 11 in its circumferential direction, while the attaching roller 75 remains in its stopped position.

When the drum 11 has rotated through the angle (b) from its original zero angle position, a control signal is sent from the sequencer to the motor of the drum 11 to stop it. A control signal is then sent from the sequencer 100 to the cylinder 78 to retract the piston rod 81 to its full extent. As a result, the rocking base 71 and the attaching roller 75 are rocked about the rocking axis Y through the angle G in the clockwise direction as viewed in FIG. 6. In this case, as the angle G is substantially equal to the inclined angle H of the layer L relative to the circumferential direction of the drum 11, the straight line in parallel with the winding direction of the layer L intersects the rotating axis P of the attaching roller 75 at right angles.

With control signals from the sequencer 100, the drum 11 is then rotated at high speed and the motor 53 is energized to rotate the screw shaft 39 in the direction opposite to the direction described above. In this manner, the traverse frame 27 and the other members are returned (moved from the other end to the one end of the drum 11) so that the attaching roller 75 is moved from the other end to the one end in the region R or from the point h to the point g, while the attaching roller 75 is rolled on the drum 11. As a result, the layer 11 is urged against the drum 11 by means of the attaching roller 75 to be attached to the outer circumference of the drum 11 at an inclined angle such that the layer L approaches the one axial end of the drum 11 as it advances forward in the rotating direction of the drum 11. Because the straight line in parallel with the winding direction of the layer L intersects the rotating axis P of the attaching roller 75 at right angles as described above, the supply direction and the winding direction of the layer L are coincident with each other. Consequently, the layer L upon being wound is not subjected to any external force in its width direction from the attaching roller 75 so that the layer L can be wound around the drum 11 in a good condition.

When the drum has been rotated through the angle c and the attaching roller 75 has arrived at the point g, the drum 11 is once stopped and the motor 53 is deenergized with control signals from the sequencer 100. The cylinder 78 is then actuated to extend its piston rod 81 to its full extent with a control signal from the sequencer 100. As a result, the attaching roller 75 is rocked until its axis P becomes horizontal. The drum 11 is rotated at low speed with a control signal from the sequencer 100, while the motor 53 remains in a deenergized state so that the layer L is attached to the drum 11 in its circumferential direction, while the attaching roller 75 is in its stopped position.

When the drum 11 has been rotated through the angle (d), the drum 11 is stopped and the motor 53 is a deenergized with a control signals from the sequencer 100. Thereafter, the apparatus is returned to the initial state and the operation is again started for attaching a layer L around the drum 11 inclined at the predetermined angle Ho A layer L is supplied to the drum 11 rotating about its axis 12, while the layer is swung in a constant region R in the axial direction of the drum 11 so that the layer L is wound around the drum in a zigzag pattern.

By repeatedly performing the aforementioned movement the number of times memorized in the sequencer 100, it is possible by one operation to form two plies whose layers in the respective plies intersect each other or plies of plural times two as the case may be. When the formation of plies has been completed in this manner, the cylinder 64 is actuated to retract its piston rod 66 and the base plate 18 is retracted along the guide rails 17 to its waiting position, whereby moving the support base 62, the rocking base 71 and the attaching roller 75 in unison away from the drum 11.

While the drum 11 having the arcuate outer surface 13 is shown onto which a layer L is attached, it will be apparent that the invention is applicable to a drum 11 having a cylindrical outer surface.

As can be seen from the above explanation, although the apparatus according to the invention is very simple in construction, a narrow belt-shaped member can be wound around the drum in a zigzag pattern in good condition.

While the invention has been particularly shown and described with reference to preferred embodiments thereof, it will be understood by those skilled in the art that the foregoing and other changes in form and details can be made therein without departing from the scope of the claims.

What is claimed is:

1. A belt-shaped member winding apparatus for winding a narrow belt-shaped member in a zigzag around a drum by supplying to said rotating drum the narrow belt-shaped member being swung in axial directions of said drum within a predetermined region, said narrow belt-shaped member having a width narrower than a width of said drum to permit plural zigzag windings of said narrow belt-shaped member on the .drum surface, said apparatus comprising; a support base, reciprocative motion means for reciprocatively moving said support base substantially along an axis of said drum between both ends of the predetermined region to maintain a distance between said drum and said support base at a constant value, a rocking base supported by said support base to be rocked about a rocking axis which is normal to an outer surface of said drum, rocking means for rocking said rocking base, and an attaching roller supported on said rocking base to be rotated about an axis substantially in parallel with said axis of the drum for urging and attaching the supplied narrow belt-shaped member to said drum after being wound partially around said attaching roller, thereby causing the rotating axis of the attaching roller to intersect perpendicularly a straight line in parallel with winding directions of the narrow belt-shaped member by rocking said rocking base and said attaching roller by means of said rocking means.

2. The apparatus as set forth in claim 1, wherein said reciprocative motion means comprises guide means for guiding the support base and driving means for driving the support base, said guide means comprising a guide plate having two sides, a traverse frame connected to said support base and guided by said guide plate, two rollers rotatably supported on said traverse frame and to be in rolling contact with said guide plate on one side thereof, at least one roller provided on the other side of the guide plate and supported by an arm having two ends, one end thereof being pivotally connected to said traverse frame, and a cylinder whose cylinder head end is connected to said traverse frame and piston rod end being pivotally connected to the other end of said arm, thereby enabling said one roller to be rolling contact with the guide plate on the other side thereof, and said driving means comprising a screw shaft reversibly driven by a motor, a movable block threadedly engaged on said screw shaft to be reversibly movably in axial directions of the screw shaft, slide rails for guiding the movable block, an endless chain extending around sprockets, and a chain guide for guiding the endless chain.

3. The apparatus as set forth in claim 2, wherein said two roller and said one rollers on both the sides of the guide plate are arranged so that when all of these rollers are in contact with the guide plate, the rotating axes of these rollers form an imaginary isosceles triangle whose median orthogonally intersect a straight line in parallel with the axis of the drum.

4. The apparatus as set forth in claim 2, wherein said chain guide is arranged so that when the endless chain is in contact with the outer periphery of the chain guide, a vertical straight line extending downwardly from a contact point between the outer surface of the drum and the outer peripheral surface of the attaching roller at the center of its width, intersects said chain.

5. The apparatus as set forth in claim 1, wherein said rocking means comprises a pair of vertically extending cylinders integrally connected to each other by means of a bracket and arranged on one side of said rocking base, the piston rod end of one of said pair of vertically extending cylinders being connected to the lower end of said support base, and the piston rod end of the other of said pair of vertically extending cylinder being connected to the rocking base.

6. The apparatus as set forth in claim 5, wherein the rocking axis of said rocking base is arranged to be coincident with the normal to the outer surface of the drum at the contact point between the outer surface of the drum and the outer peripheral surface of the attaching roller at the center of its width.

7. The apparatus as set forth in claim 1, wherein said rocking base is provided with a guide unit rockable about a vertical axis in a horizontal plane, through which said narrow belt-shaped member is supplied.

* * * * *